United States Patent [19]

Maki et al.

[11] Patent Number: 4,926,286

[45] Date of Patent: May 15, 1990

[54] ENCLOSED SWITCHBOARD

[75] Inventors: Kazuyoshi Maki; Sadami Harada; Takanori Nakashima, all of Saga, Japan

[73] Assignee: Togami Electric Mfg., Co., Ltd., Saga, Japan

[21] Appl. No.: 245,882

[22] Filed: Sep. 16, 1988

[30] Foreign Application Priority Data

Sep. 24, 1987 [JP] Japan .................................. 62-240483

[51] Int. Cl.⁵ ............................................... H02B 1/14
[52] U.S. Cl. .................................. 361/345; 200/50 A; 200/50 AA; 361/337; 361/339; 361/391
[58] Field of Search ............. 200/50 AA, 50 R, 50 A, 200/50 B; 361/337, 339, 343, 344, 345, 391

[56] References Cited

U.S. PATENT DOCUMENTS 2,914,707  11/1959  Timmerman ......................... 361/345
2,921,998   1/1960  Pokorny et al. ...................... 361/337
4,754,367   6/1988  Bohnen ................................ 361/339

Primary Examiner—Gregory D. Thompson
Attorney, Agent, or Firm—Jordan and Hamburg

[57] ABSTRACT

An enclosed switchboard has a contact frame fitted with contacts which can move relative to a unit frame having a circuit breaker, an electromagnetic switch, and an auxiliary relay, etc. mounted thereon. The contacts can be operated to disconnected, test, and connected positions with the unit frame disposed in the panel frame by an operating lever inserted into a window on a closed door covering the front side of the panel frame. A shutter mechanism is provided between the window and the insertion position of the operating lever in order to cover the insertion position of the operating lever for preventing insertion of the operating lever when the operating handle is set to an ON position, and an interlocking mechanism is also provided between the shutter mechanism and the operating handle of a circuit breaker disposed at the unit frame.

15 Claims, 11 Drawing Sheets

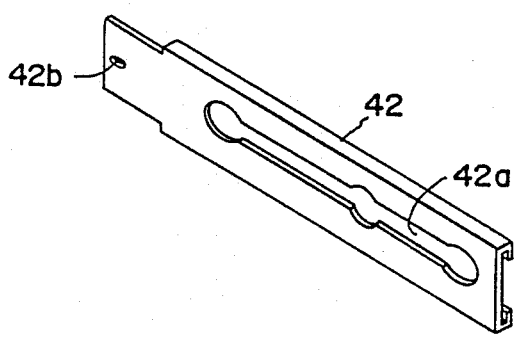
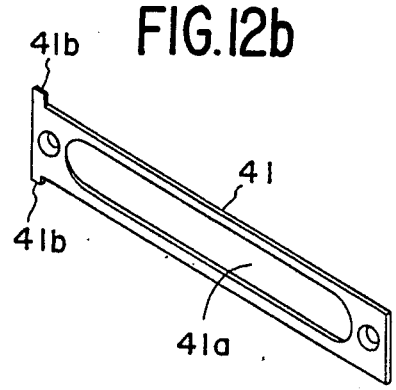
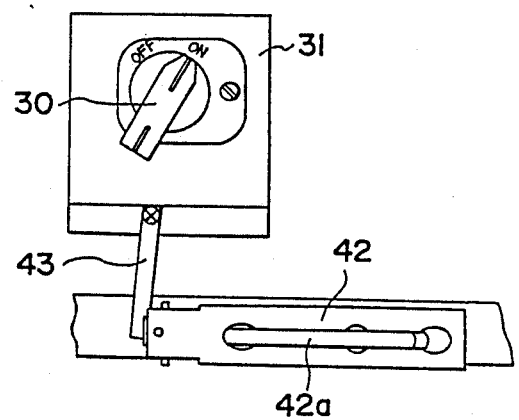

ENCLOSED SWITCHBOARD

BACKGROUND OF THE INVENTION

1. Field of the Invention

This invention relates to an enclosed switchboard such as a motor control center or the like.

2. Background of the Invention

Generally in an enclosed switchboard such as a motor control center or the like, plural unit chambers are constructed by a vertically partitioned box-like frame with shelf plates for several stages, and control units are housed in these unit chambers so that they are drawably placed. On the common frame of such control units are arranged various kinds of control devices such as circuit breakers, electromagnetic contactors, control relays, etc., and their connecting circuits are so composed that intended control functions can be obtained. The main circuit, or occasionally the control circuit thereof is so constructed as to automatically connect to and disconnect from the corresponding circuit on the panel frame side by a put-in and a pull-out operation relative to the switchboard frame.

Contacts are so arranged on the rear of the control unit that putting in the control unit brings a power contact into connection with a bus bar (generally vertical bus bars) arranged on the panel frame of the switchboard, through which power is supplied to equipment mounted on the switchboard. This also brings load contacts into connection with the load side terminals, thereby power is supplied to the load side with switching on and off by way of the control unit.

An enclosed switchboard provided with such drawer type control units is so designed that the front door of the panel frame can be closed only with the units in their inserted positions. Meanwhile, in the test and disconnected positions with the contacts drawn out of the bus bars, the control units project from the front of the panel frame, preventing the door from being closed.

In the conventional switchboard described above, the door can not be closed in the disconnect and test positions but can be closed in the connect position, necessitating that the door be left open while checking the interior in the testing position or in the disconnected position. However, leaving the door open impairs the enclosed function of the switchboard, allowing for electric shock and other dangers due to the blowing emission of arcs and substances out of the switchboard in case of accidents. It may also block the passage and hamper operators from passing through, sometimes causing injuries or damage due to accidental bumping.

Thus, for the above reasons, it is very inconvenient in such conventional enclosed switchboards when the control unit is not placed in the connected position for a long time, for example when the control units must be removed and stored at some location, to close the door so as not to block the passage in front of the switchboard.

In order to solve the problems described above, there has been proposed an enclosed switchboard which is described hereinafter and which is disclosed in Japanese patent application No. 61-180743 and U.S. Pat. No. 4,860,161 issued Aug. 23, 1989.

Namely, FIGS. 15 and 16 are a horizontal plane view and a front view of such an enclosed switchboard. In these figures, numeral 1 indicates a panel frame constituting the boxlike body of the switchboard, numeral 2 indicates shelves fixed to the panel frame, and numerals 3 and 4 are doors. The shelves 2 are fitted with guide frames 2a. A unit frame 5 provided with various pieces of equipment is disposed on the guide frames 2a and is inserted from the front of the panel frame 1. The numeral 6 is a roller fitted to permit easy mounting of the unit frame 5 with a slight force. The unit frame 5 has a contact mounting frame 9 equipped with a power contact 7 and a load contact 8 and is so mounted on the rear as to travel in the connecting and disconnecting directions of such contacts 7 and 8, i.e., in the forward and backward direction thereof. The contacts 7 and 8 are wired using wires (not shown) with the equipment mounted on the frame 5.

The panel frame 1 has a bus bar 10 of such as a 3-phase 4-wire system and a load-side terminal 11 to which the power contact 7 and the load contact 8 are to be connected respectively.

Lock pins 12 (FIGS. 15, 17a, 17b) are set up at two points on the shelf plate 2. When the unit frame 5 is inserted in the shelf plate 2, these lock pins 12 are so disposed that a hook 13 of which an intermediate portion is rotatably mounted by means of an axis 13a and on which a groove 13b is provided on the front side (in the clockwise direction) of the hook 13 is engaged with the lock pins 12 so as to prevent removal of the unit frame 5 from the panel frame 1. The numeral 14 indicates a spring for energizing the hook 13 in a clockwise direction to retain the engagement thereof and 13c is a release lever operable to cancel the engagement thereof.

As shown in FIG. 17a, the hook 13 has a projection 13d, a concave portion 13e, and a straight portion 13f formed on the back, which operate together with an actuator 24 fixed at the side of the contact mounting frame 9. When the contact mounting frame 9 is disconnected from the unit frame, as shown in FIG. 17(a), the actuator 24 forces the projection 13c against the energizing force of the spring 14, causing the hook 13 to slightly pivot around the axis 13a and thereby withdraw a little from the lock pin 12. Under this condition, putting in the unit frame 5 together with the contact mounting frame 9 along the shelf 2 causes the lock pin 12 shown in a dot-dash line in FIG. 17(a) to come into contact with the cam slant 13g of the hook 13, move the hook 13 at a slight incline to the left, and finally engage with the groove 13b thereof as shown in a solid line. The unit frame 5 may be smoothly removed from the shelf 2 by pulling the frame 5 with the release lever 13c pushed by hand to the state shown in the dot-dash line, which releases the engagement between the lock pin 12 and the hook 13.

When the contact mounting frame 9 is in the test or connected position in relation to the unit frame 5, the possible insertion of the unit frame 5 along the shelf 2 will lead to the direct connection of the contacts to the power source, which could prove to be dangerous. Pulling out of the unit frame 5 from the shelf 2 in the test or connected position is also dangerous. Therefore, the construction is such that, when the contact frame 9 is in the test and connected positions in relation to the unit frame 5, as shown in FIG. 17(b), the actuator 24 is in contact with the straight portion 13f of the hook 13 on the back. In FIG. 17(b) the actuator 24 is shown in the test position by the solid line, and in the connected position by the dot-dash line. While the contact mounting frame 9 is positioned in such a relation with the unit frame 5, the hook 13 cannot be pivoted by the actuator 24, thus enabling the hook 13 to prevent the lock pin 12 fixed on the shelf 2 from being engaged or disengaged. Accordingly, in the state shown in FIG. 17(b) the unit frame 5 is prevented from being inserted in the shelf 2 as well as being prevented from being removed in spite of pushing of the release lever 13c. In this way the loading and unloading of the unit frame is allowed only in the disconnected position of the contacts, thereby enhancing safety.

The unit frame 5 is fitted with an interlocking arm 16 rotatably mounted around an interlocking arm axis 15 fixed to the unit frame 5 for driving the contacts, while the contact mounting frame 9 is furnished with a driving shaft 17, which is inserted in a slot 16a disposed at the edge of the interlocking arm 16 for floating engagement therein. An operating rod 19 is fixed at the base of the interlocking arm 16 for engaging the operating lever 18 and which moves the contact mounting frame 9 to its test and connected positions. The edge of the operating rod 19 faces a slot 5b (FIG. 16) in a grip frame 5a at the front of the unit frame 5.

The operating rod 19 contains a lock collar 21 (FIG. 22), urged forward by a spring 20, and having a guide hole 21a in the center thereof in which the end of the operating lever 18 shown in FIG. 18 is inserted. The operating lever 18 consists of the inserting portion 18a, a collar 18b, a small diameter portion 18c and a grip 18d. The grip 18d has a rubber coating. The inserted end 18a has a diameter larger than the width of the slot 5b of the grip frame 5a shown in FIG. 16 and smaller than the diameters of notches 5b-1, 5b-2, and 5b-3. The diameter of the small diameter portion 18c is smaller than the width of the slot 5b. The diameter of the collar 18b is larger than that of the guide hole 21a in the lock collar 21, larger than the width of the slot 5b of the grip frame 5a, and smaller than the diameters of the notched portions 5b-1, 5b-2, and 5b-3. Thereby the operating lever 18 can not be inserted at any other position of the slot 5b than the notched portions 5b-1, 5b-2 and 5b-3. Once the operating lever 18 has been inserted in, the lock collar 21, it can not be removed from the slot at any intermediate position but can be removed only at the notched portions 5b-1, 5b-2 and 5b-3. In addition, at these notched portions 5b-1, 5b-2 and 5b-3, the tip end of the lock collar 21 is such that it projects forwardly due to the energizing force of the spring 20.

The lock collar 21 has its end of a diameter slightly smaller than those of the notches 5b-1, 5b-2, and 5b-3, thereby permitting the collar 21 when projected as mentioned above to engage with the notches and lock.

Thus, turning the operating lever 18, the end thereof being inserted in the lock collar 21, clockwise in the drawing moves the contact unit 9 to its test and connected positions. Referring to FIG. 16 the three notches of a larger diameter 5b-1, 5b-2, and 5b-3 of the slot 5b indicate the disconnected, test, and connected positions respectively, only in which positions the end of the operating lever 18 can be inserted therein and removed therefrom.

The operating lever 18 can be shifted to the notched portion 5b-2 which is test position and the interim position, from the other notched portions 5b-1 or 5b-3. Test position stoppers 22 and 23 are furnished to prevent the operating lever from shifting, thereby causing the operating lever 18 to be prevented from accidental movement from the test position to the disconnected position or the connect position and causing the operating lever 18 to be prevented from directly shifting to the connect position by an overtraveling force when the operating lever is to be shifted toward the test position. When shifting the operating lever 18, it can be freely moved with the other end lifted by pushing the projection portions 22a and 23b of the stoppers 22 or 23.

In FIG. 21 the numeral 25 indicates a name-plate which shows the position of the contact operating mechanism and the contact position.

In addition, stoppers 5c and 5d (see FIG. 22.) are provided on the grip frame 5a to bring the operating rod 19 to a halt when the operating rod 19 is activated to both ends of the slot 5b and the end of the operating rod 19 has reached the notched portions 5b-1 or 5b-3. These stoppers 5c and 5d are so arranged as to contact the trapezoidal head formed at the edge of the operating rod 19, the slant side of such trapezoidal head being so designed as to contact with the stoppers 5c and 5d nearly at a right angle thereto.

FIGS. 19 and 20 respectively show the states where the contact mounting frame 9 has been moved to its test and connected positions by way of the operating lever 18.

In the test position as shown in FIG. 19, the power contact 7 is in contact with the bus bar 10 to supply power to the on board equipment of the unit frame 5, while the load contact 8 is in such a position as to be out of contact with the load side terminal 11 affording enough space for disconnection, thereby providing the power supply to the equipment to be subjected to the test without any supply to the loads.

In the connected position shown in FIG. 20, both the power contact 7 and the load contact 8 are connected to the bus bar 10 and the load side terminal 11 respectively. Thus, it is in a normal operating state.

As shown in the above, the unit frame 5 can be stored at a certain fixed position where the door 3 can be closed and blocked in relation to the panel frame 1. At this position it is possible to operate the contact mounting frame 9 to the disconnected, test, and connected positions.

An operating handle is provided on the panel surface, in order to provide ON-OFF operations of a circuit breaker built in the enclosed switchboard. In order to avoid danger a door of the enclosed switchboard can be constructed such that it can be opened only when the operating handle is set to OFF. This is completely the same in an enclosed switchboard of the above mentioned structure.

Therefore, a contact mounting frame can be shifted from a disconnected position to a test position and furthermore, to a connect position with its door closed for the sake of preventing danger when operating with the door opened, preventing invasion of foreign matter and dust to the inside and furthermore eliminating troublesome opening operations of the door.

For this reason, as shown in FIG. 2 an opening 3a is formed in the door 3 so that the slot 5b which is formed at a grip frame 5a of the unit frame 5 may be exposed to the front side and so that the operating lever 18 shown in FIG. 18 can be inserted through the opening 3a. However, if only the opening 3a is provided in the door 3, any interlocking mechanism by which the contact portion can be closed and opened only when the circuit breaker is turned off would not be feasible.

SUMMARY OF THE INVENTION

The present invention intends to solve these problems. Therefore, one of the important objects of the present invention is to provide an interlocking mechanism for opening and closing operations of the contact portion even in cases in which an opening for insertion of an operating lever is provided in the door.

To accomplish this object of the present invention in an enclosed switchboard, a device mounting unit frame is installed on a shelf plate mounted on a panel frame so that the unit frame can be freely drawn out and inserted, a contact mounting frame furnished with a power contact which can be connected to and disconnected from bus bar is arranged on the panel frame and a load contact which can be connected to and disconnected from a load side terminal is transferably installed in the above direction of connection and disconnection in relation to the unit frame, and a lever interlocking mechanism by which rotational movement of the operating lever at the front side of the unit frame can be converted to movements in the direction of connection and disconnection of the unit frame is provided. The enclosed switchboard features an opening formed at a position corresponding to the spot of insertion of the operating lever in the lever interlocking mechanism on the door to cover the front side of the panel frame, a shutter mechanism to cover the spot of insertion of the operating lever installed between the opening and the spot of insertion of the operating lever, and an interlocking mechanism provided between the shutter mechanism and an operating handle of a circuit breaker provided on the unit frame.

A new and novel structure of an enclosed switchboard disclosed by the present invention is accomplished by the following features such as that an opening portion is formed at a position corresponding to the spot of insertion of an operating lever on a door to cover the whole front side of panel frame, a shutter mechanism is provided to cover the portion of the spot of insertion of the operating lever between the opening portion and the spot of insertion of the operating lever, and an interlocking mechanism is provided between the shutter mechanism and an operating handle of a circuit breaker provided in the unit frame. For this reason, it is possible to operate the contact mounting frame with the door of the switchboard closed, and the operation thereof is also made very easy. Thus as there is no need to open the door when effecting operation of the contact mounting frames, there is no concern about electrical shock to electrically charged portions of the operation unit. Therefore, the structure disclosed by the present invention gives a sense of safety to operators and the safety in operation is considerably increased. Furthermore, as a shutter mechanism is provided, it is impossible to shift the contact mounting frame to a connect position and to draw it out from the connect position, thereby preventing accidents.

BRIEF DESCRIPTION OF THE DRAWINGS

FIGS. 6a and 6b are front and side views of the shutter mechanism when the operating handle is turned on;

FIGS. 12a and 12b are perspective views of the shutter and shutter guide shown in FIGS. 11a and 11b;

FIG. 13 is a view similar to FIG. 11a but showing another alternate embodiment;

DESCRIPTION OF THE PREFERRED EMBODIMENTS

Figure 15:
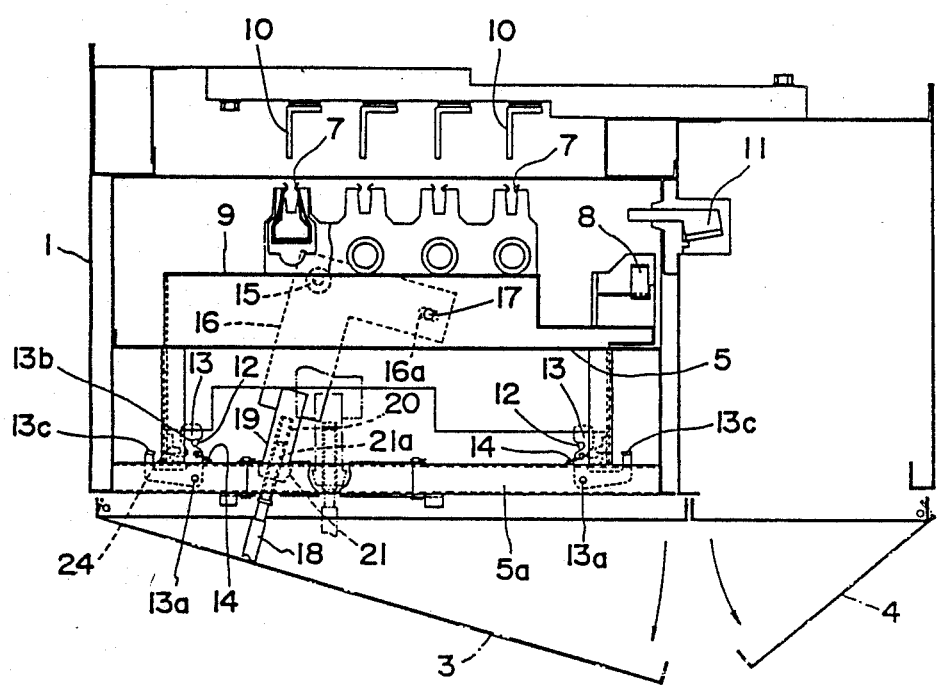
FIG. 15 is a cross sectional plan view showing an enclosed switchboard.
Figure 16:
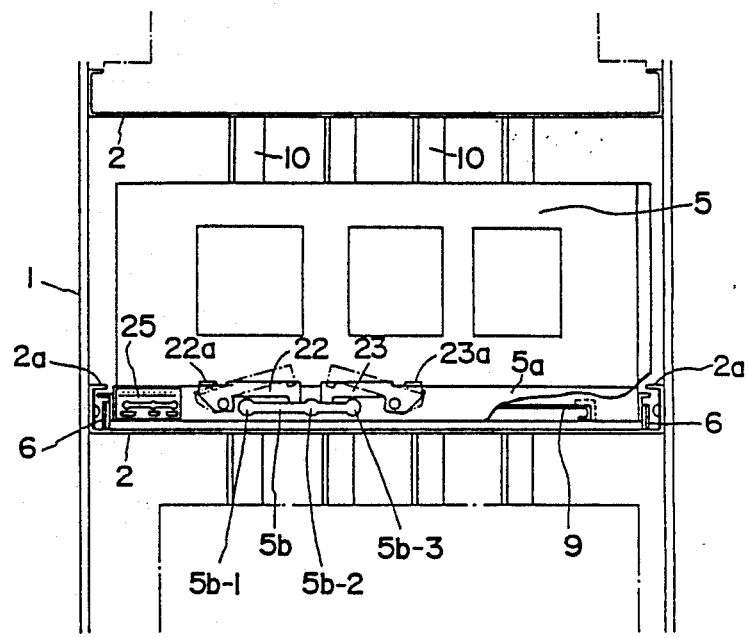
FIG. 16 is a front elevational view of the main part of the enclosed switchboard shown in FIG. 15.
Figure 17A:
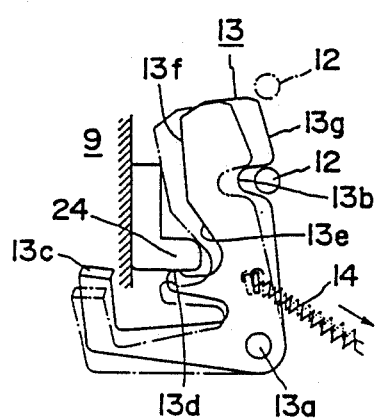
FIG. 17 is an explanatory view showing the relationship of the engagement between a hook and a lock pin.
Figure 17B:
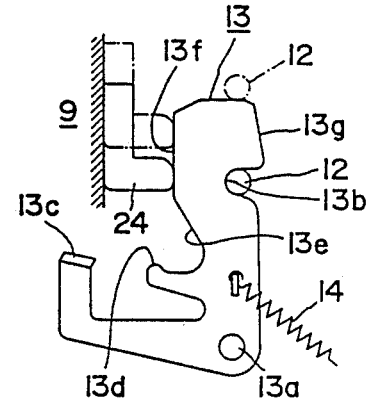
Figure 18:
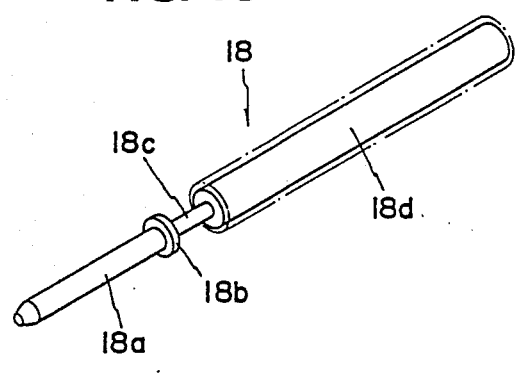
FIG. 18 is a perspective view of the operating lever.
Figure 19:
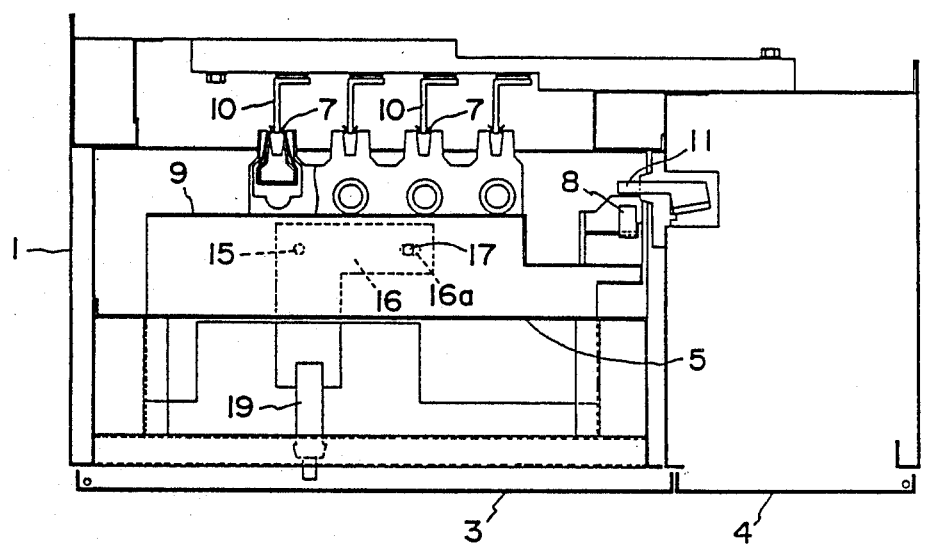
FIGS. 19 and 20 are each plan views showing the position of the contact mounting frame at the test position and connect position, respectively.
Figure 20:
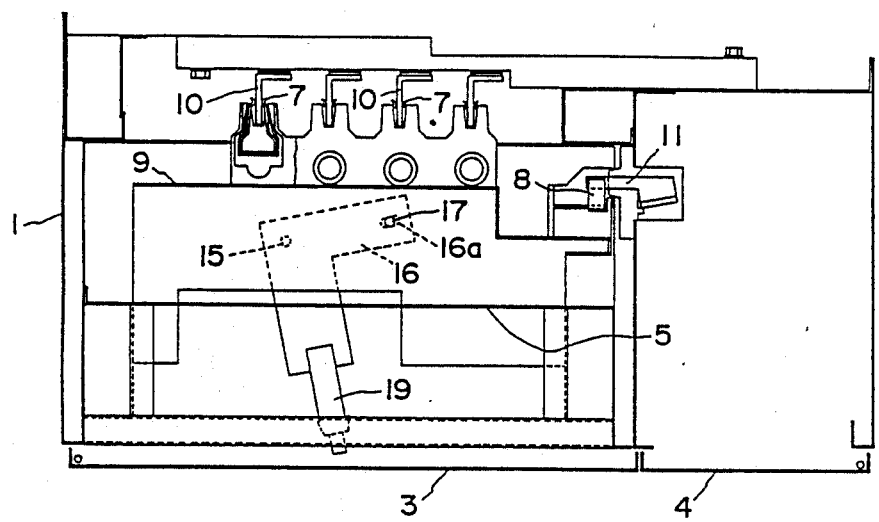
Figure 21:
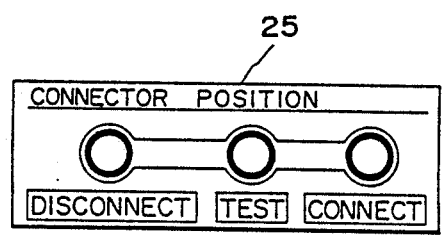
FIG. 21 is a front elevational view showing the details of a name plate.
Figure 22:
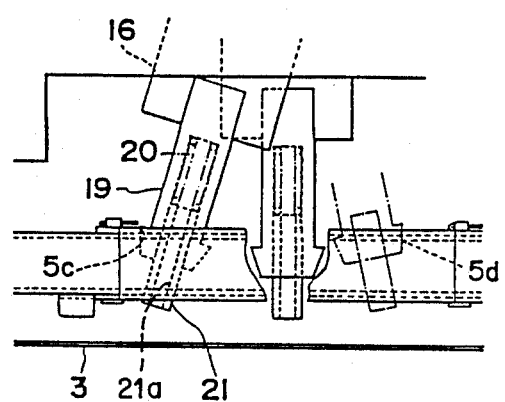
FIG. 22 is an explanatory drawing showing the relationship between an operating rod and a stopper.

The following is a detailed description of a preferred embodiment which is shown in the drawings. All those components which have the same functions as those which are shown in those figures after FIG. 15 are given the same number, and an explanation for them is omitted herein.

Figure 1:
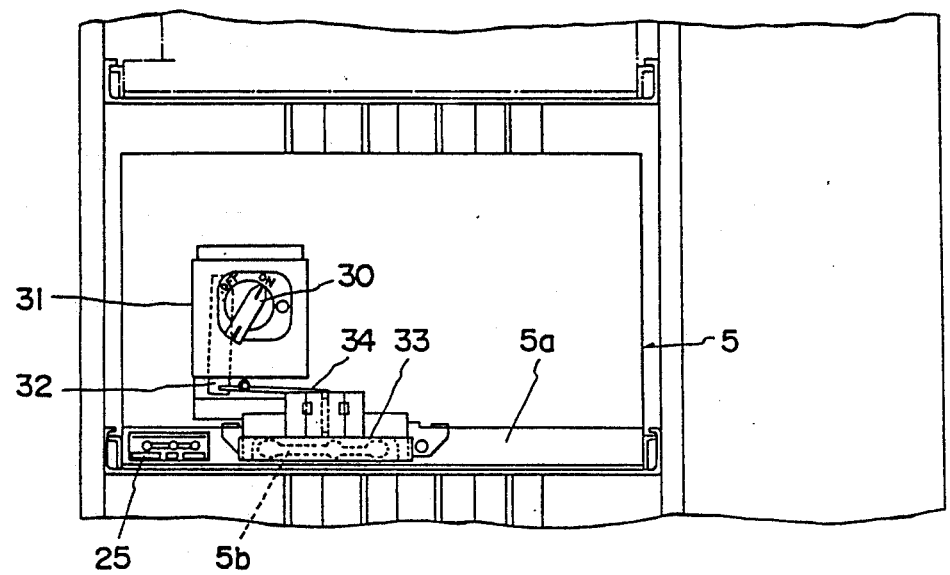
FIG. 1 is a front elevational view of an enclosed switchboard with the door shown in its open position.

FIG. 1 is a front elevation of a unit frame 5 with a door 3 in its open position. In this figure, 30 is an operating handle of a circuit breaker; 31 is an operating handle mounting frame; and 32 shows an interlocking lever which can be elevated and lowered upon operation of the operating handle 30. A shutter 33 is disposed to be lowered at the front side of the slot 5b formed at the grip frame 5a of the unit frame 5 and is linked to the interlocking lever 32 via a shutter drive arm 34. The shutter 33 can cover the slot 5b when the operating handle 30 is set to ON and the slot 5b is uncovered when the shutter 33 is moved upwardly, when the operating handle 30 is set to OFF.

Figure 2:
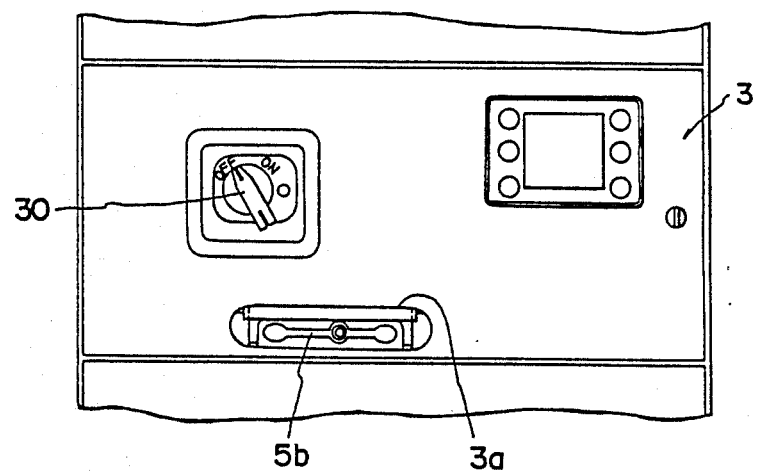
FIG. 2 is a front elevation when the operating handle is turned off with the door closed.
Figure 3:
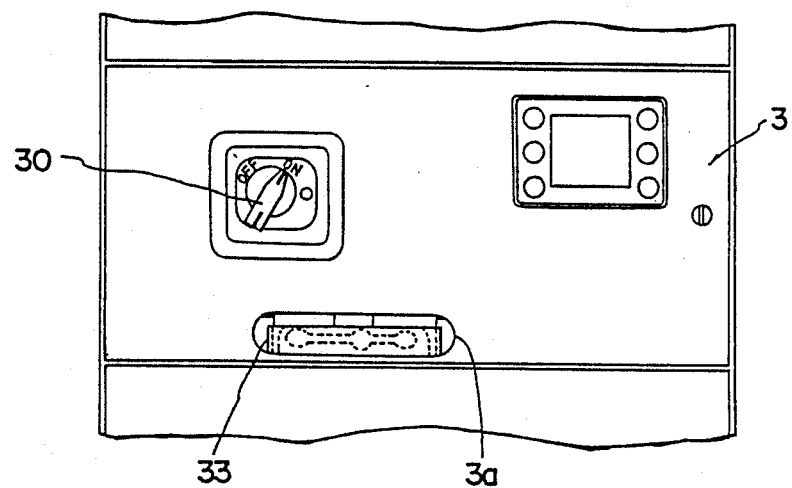
FIG. 3 is another front elevation when the operating handle is turned on with the door closed.

As shown in FIG. 2, an opening 3a is provided in the door 3 and the slot 5b is disposed at the opening 3a when the operating handle 30 is set to OFF. When the operating handle 30 is set to ON, the shutter 33 moves down to cover the slot 5b, thereby preventing the operating lever 18 from being inserted through the opening 3a.

Figure 7A:
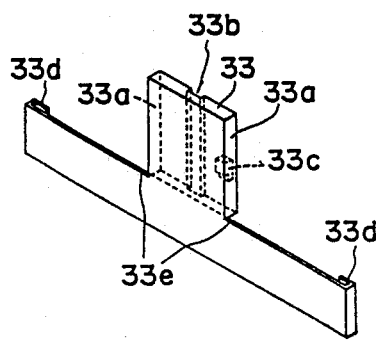
FIGS. 7a, 7b and 7c are perspective views of components of the shutter mechanism.
Figure 7C:
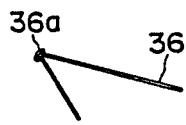
Figure 7B:
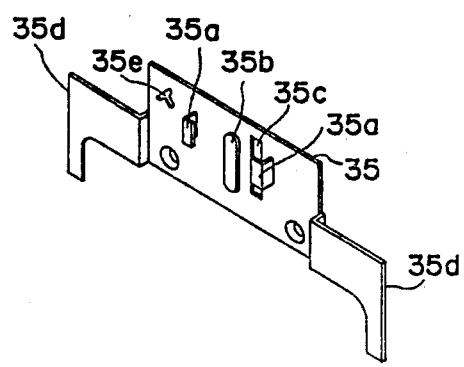

FIGS. 7a to 7c show the details of this shutter mechanism. FIG. 7(a) shows the shutter itself 33; FIG. 7(b) shows a guide plate 35 of the shutter; and FIG. 7(c) shows a spring 36 by which the shutter is usually lifted up. The shutter guide plate 35 is screwed to the grip frame 5a of the unit frame 5, and the shutter 33 is installed for free elevation and lowering in relation to this shutter guide plate 35. The shutter guide plate 35 is furnished with L-shaped 1st guides 35a which are internally folded respectively and a 2nd guide 35b which projects outwardly and which is elongated in the vertical direction. The L-shaped 1st guides 35a and the 2nd guide 35b operate together with sides 33a and guide groove 33b of the shutter 33 such that the shutter 33 can smoothly move in the vertical direction. Shoulders 33e of the shutter 33 contact the L-shaped guides 35a on the shutter guide plate 35, to prevent the shutter 33 from being elevated beyond a predetermined position. Both lower end parts of the shutter 33 have a folded portion 33d. This folded portion 33d holds an edge 35d of the shutter guide plate 35, thereby preventing inclination of the shutter 33 during vertical movement of the shutter guide plate 35. When the shutter 33 is assembled in the shutter guide plate 35, a spring 36 shown in FIG. 7(c) is so constructed that one end thereof is engaged with an engagement projection 33c, a bent portion 36a is engaged with a mounting hole 35e of the shutter guide plate 35 and the other end thereof is engaged with the shutter guide plate 35. Usually the shutter 33 is urged upwards by the spring 36.

Figure 4A:
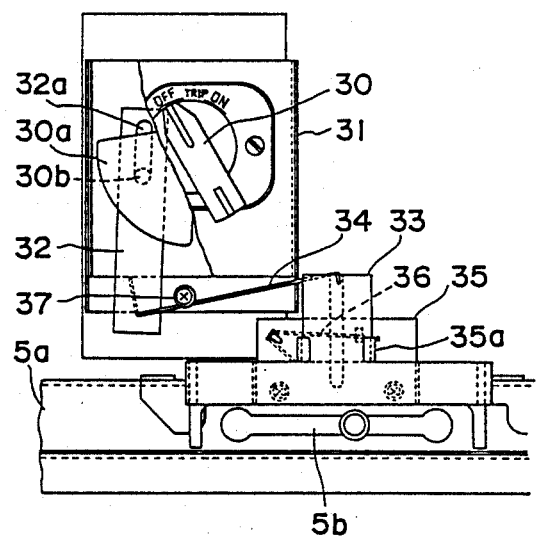
FIGS. 4a and 4b are front and side explanatory views of a shutter mechanism when the operating handle is turned off.
Figure 4B:
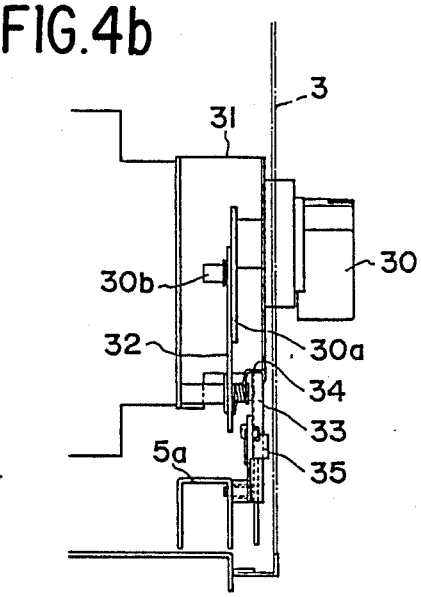

FIGS. 4a and 4b show the state where the shutter mechanism constructed as shown in the above description is built so as to be interlinked with the previously described shutter drive arm 34. FIG. 4(a) shows a front elevation and FIG. 4(b) shows a side view in which the operating handle 30 of the circuit breaker is set to OFF. In this same Figure, a pin 30b is attached to a cam plate 30a which is interlocked to rotate with the operating handle 30, thereby causing this pin 30b to be engaged with a slot 32a provided in the interlocked lever 32. In addition, the shutter drive arm 34 is made of spring material and is linked to the lower end portion of the interlocking lever 32. The interim portion of the shutter drive arm 34 is pivotably supported at another pin 37 attached to the mounting frame 31 of the operating handle, and the tip end thereof is engaged and fixed to the upper end portion of the shutter 33. Under the condition shown in FIGS. 4a and 4b, as the operating handle 30 is set to OFF, the interlocking lever 32 is pushed downwards, and since no pushing force is applied to the shutter 33 by the shutter drive arm 34, the shutter 33 is elevated by means of the pushing force of the spring 36. Therefore, it is possible to insert the operating lever 18 in the slot 5b and to operate the contact mounting frame 9 to each of the positions thereof.

Figure 5A:
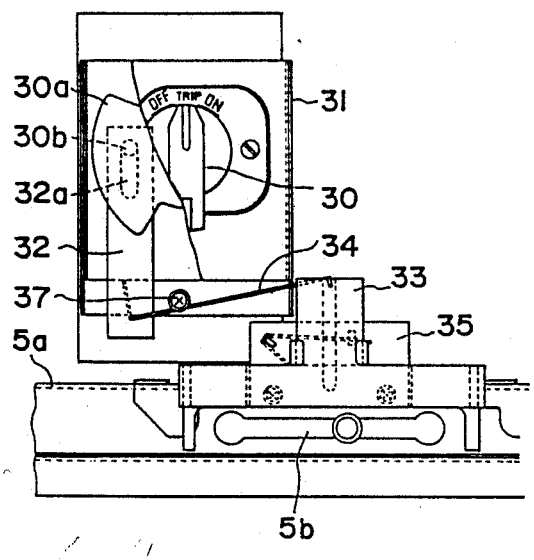
FIGS. 5a and 5b are front and side views of the shutter mechanism when the operating handle is turned to its trip position.
Figure 5B:
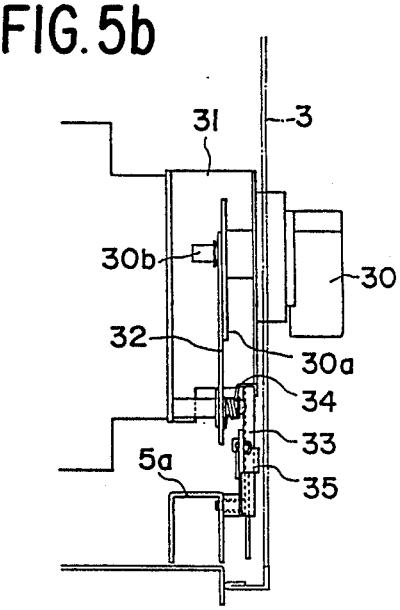

FIGS. 5a and 5b show the state where the operating handle 30 is located at its trip position. FIG. 5(a) is a front elevation view and FIG. 5(b) is a side view. The cam plate 30a is rotated through a prescribed angle from the state shown in FIGS. 4a and 4b. But only the pin 30b moves in the slot 32a of the interlocking lever 32 and the position of the interlocking lever 32 in the vertical direction is not changed. Namely, the shutter 33 remains elevated. Also in this condition, it is possible to operate the contact mounting frame 9.

The reason why the circuit breaker is at its TRIP position is that a certain abnormality has occurred. Therefore, for investigation of the cause, it is necessary to draw out the corresponding unit as it is. In the conventional enclosed switchboard, it is necessary to open the door and to shift the contacts to their disconnect position in order to take out the corresponding unit. If so, as at least the primary side of the circuit breaker is electrically charged even though the circuit breaker tripped, it is very dangerous since there is concern about electric shock at the primary side of the control units. Furthermore, there is another possibility for the contacts to have been connected in a certain abnormal condition due to overcurrent. If the contacts are operated under the above condition, arcing may occur thereby causing an electrical short-circuit. Thus, dangerous secondary damages may be produced. However, even though such an abnormal phenomenon occurs, the door can act as a damage prevention wall if the door is closed when the contacts are operated. Therefore, it is safer.

Figure 6A:
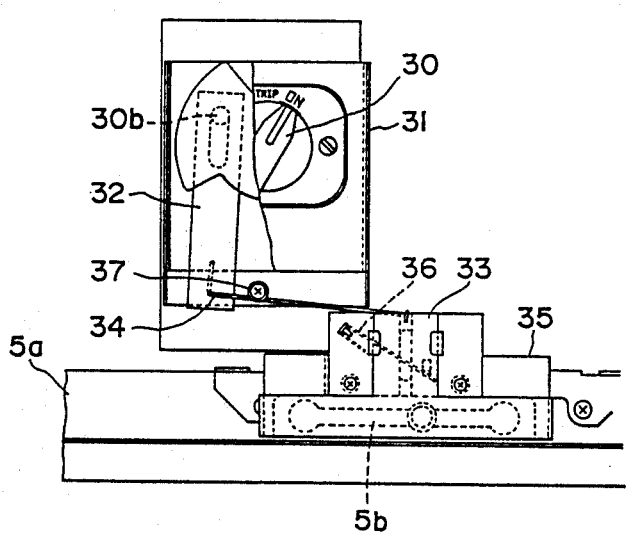
Figure 6B:
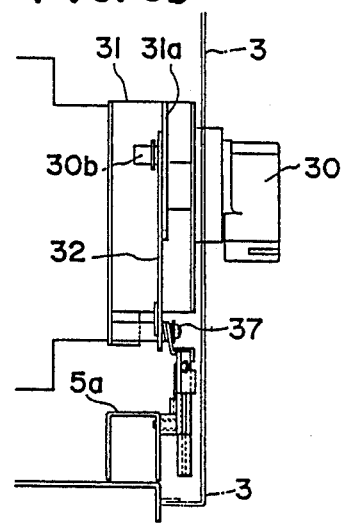

FIGS. 6a and 6b show such a state where the operating handle 30 is set to ON. FIG. 6(a) is a front elevation and FIG. 6(b) is a side view. In this condition, the interlocking lever 32 is pushed upwards by the pin 30b and the shutter drive arm 34 which is interlocked thereto is lowered at the side of the shutter 33, pivoting on the pin 37 which operates as a fulcrum. Thus, the shutter 33 overcomes the push-up force of the spring 36 and is pushed downwards. Therefore, the slot 5b is covered, thereby preventing the operating lever 18 from being inserted. Accordingly, the contact mounting frame 9 can not be operated.

Figure 8B:
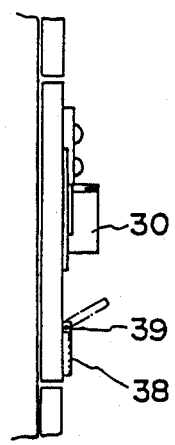
FIGS. 8a and 8b are front and side views of an alternate embodiment of an enclosed switchboard.
Figure 8A:
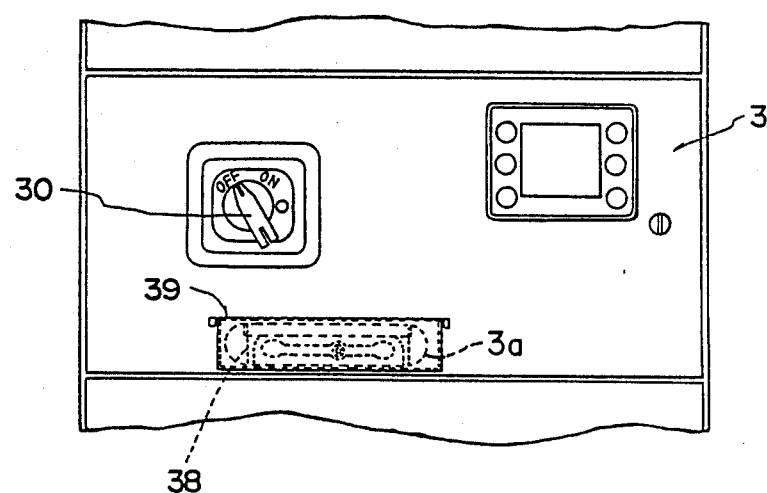

FIGS. 8a and 8b show one of the examples of the preferred embodiment in which a dust-proof structure is used. FIG. 8(a) is the a front elevation and FIG. 8(b) is a side view. In this example, the opening 3a of the door 3 is constructed such that the opening 3a may be covered with a transparent cover 38 which can be freely opened and closed by means of a hinge 39. When operating the contact mounting frame 9, this cover 38 is opened thereby permitting the operating lever 18 to be inserted for operation. The opening 3a is closed in other cases in order to prevent invasion of foreign matter and dust.

Figure 9:
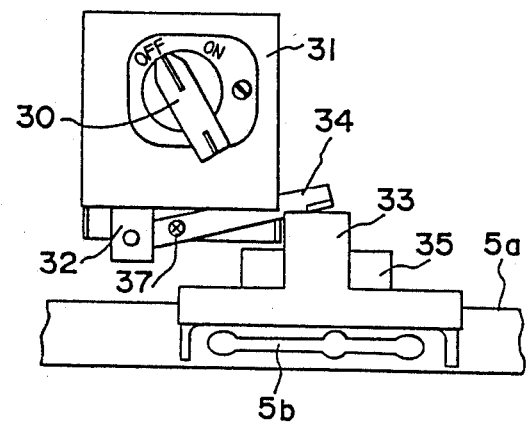
FIG. 9 is a partial front elevational view of a closed switchboard showing a further alternate embodiment.

FIG. 9 shows an example of another embodiment in which the shutter drive arm 34 is made of plate material. Namely, one end of the shutter drive arm 34, which is made of rigid material, is linked to the tip end of the interlocking lever 32, and the other end thereof is so arranged as to be brought into contact with the upper edge of the shutter 33. The operation thereof is the same as that shown for the embodiment in FIGS. 4a, 4b, 5a, 5b, 6a and 6b. Therefore, the description is omitted.

Figure 10:
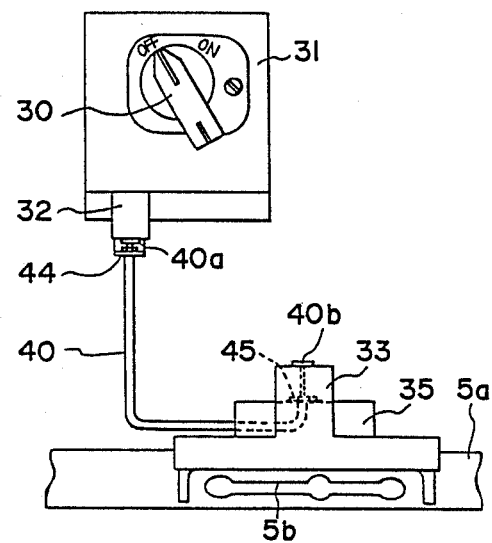
FIG. 10 is a partial front elevational view, similar to FIG. 9, of another embodiment.

FIG. 10 shows another embodiment in which a wire 40 having almost the same structure as a shutter release device of a camera is used instead of the shutter drive arm 34. Namely, the operating end 40a of the wire 40 is supported at a wire supporting bracket 44 and the operating end 40a is so arranged that it can be brought into contact with the lower edge of the interlocking lever 32. The other operating end 40b of the wire 40 is supported at another wire supporting bracket 45 and the operating end 40b is linked to the upper end of the shutter 33. In this structure, as the interlocking lever 32 is shifted down when the operating handle 30 is set to OFF, the operating end 40a of the wire 40 is pushed down, thereby causing the shutter 33 to be elevated. If this structure is employed, it is possible to propose a flexible arrangement in cases where the operating handle 30 is located far from the shutter 33.

The above embodiments of the present invention show a structure in which the slot 5b which receives the operating handle 18 can be opened and closed by vertical movement of the shutter 33. However, a horizontal slide type of shutter may also be used.

Figure 11A:
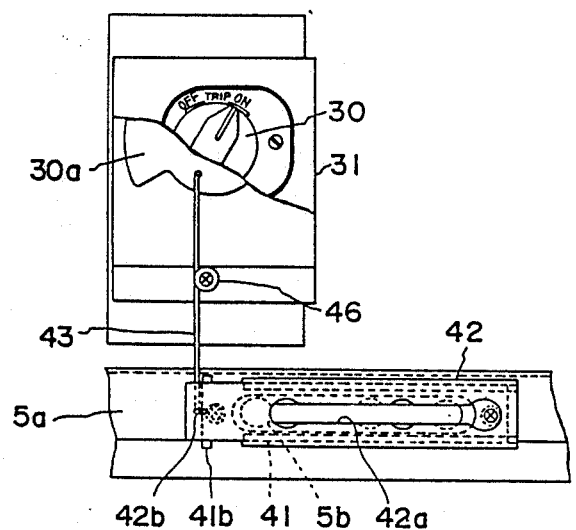
FIGS. 11a and 11b are respective front and side views of another embodiment of the shutter mechanism.
Figure 11B:
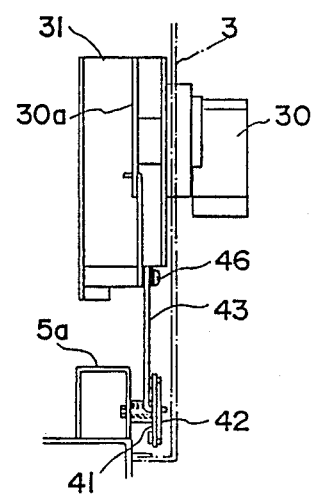

FIGS. 11a and 11b show another embodiment of the present invention having a horizontal slide type of shutter. FIG. 11(a) is a front elevation and FIG. 11(b) is a side view. FIG. 12 is a drawing showing the components thereof. Namely, as shown in FIG. 12(b), a shutter guide 41 having a groove 41a, whose width is the same as the hole diameter of the slot 5b, is mounted on the grip frame 5a and mounts a shutter 42 shown in FIG. 12(a) which is slidable in a horizontal direction. In the shutter 42, a groove 42a which is of the same type as the slot 5b is formed. As shown in FIG. 11a, an engagement hole 42b of the shutter 42 is connected to the cam plate 30a of the operating handle 30 by means of a shutter drive arm 43 which is pivotably supported by a pin 46 on the operating handle mounting frame 31. With the operating handle is set to ON, the groove 42a of the shutter 42 is slid from the slot 5b which has been formed on the grip frame 5a. Therefore, it is impossible for the operating lever 18 to be inserted. When the operating handle 30 is set to OFF or TRIP, the cam plate 30a rotates in the counterclockwise direction, thereby causing the lower end of the shutter drive arm 43 to move the shutter 42 in the left direction and to stop the shutter 42 when it comes in contact with the stopper 41b. Under this condition, as the groove 42a is aligned with the slot 5b, it becomes possible to effect operation by the operating lever 18.

Figure 14:
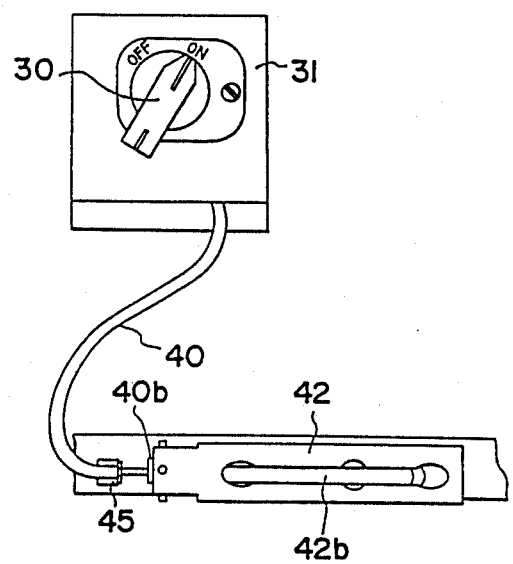
FIG. 14 is a view similar to FIG. 13 but showing yet another alternate embodiment.

FIG. 13 shows still another embodiment in which the shutter drive arm 43 in FIG. 12 is made of a plate material instead of a spring material. FIG. 14 shows another embodiment in which a wire 40 having the same structure as that of a shutter release device of a camera is used instead of the shutter drive arm 43. In this example, the operating end 40b of the wire 40 is supported by a supporting bracket 45, and the shutter 42 is pushed and pulled by the operating end 40b thereof, as in the example shown in FIG. 10, thereby causing the positions of the groove 42b and the slot 5b to be aligned and misaligned. Hence, it is possible to control operations by means of the operating lever 18.

The present invention is not limited to the above examples of the various embodiments. That is, a shutter mechanism and an opening and closing mechanism thereof can be accomplished by other methods and in different manners.

We claim:

1. An enclosed switchboard comprising a panel frame means, fixed contacts on said panel frame means, moveable contact frame means moveably mounted on said panel frame means, said moveable contact frame having moveable contacts, said moveable contact frame means being moveable between at least one operable position wherein at least one of said moveable contacts is in contact with at least one of said fixed contacts and a second operable position wherein said at least one moveable contact is out of contact with said at least one fixed contact, operable means operably connected between said moveable contact frame means and said panel frame means for moving said moveable contact frame means between said first and second operable positions, said operable means having handle-receiving means for receiving a handle which is operable to move said moveable contact frame means between said first and second operable positions, said panel frame means having a handle access opening through which said handle extends when said handle is disposed in said handle-receiving means, a shutter means mounted on said panel frame means for movement between a blocking position and a non-blocking position, said shutter means in said non-blocking position being clear of said handle access opening to thereby permit said handle to be inserted into said handle-receiving means and to move said moveable contact frame means between said first and second operable positions, said shutter means in said blocking position blocking at least a portion of said handle access opening to prevent said handle from being inserted into said handle-receiving means and thereby precluding movement of said moveable contact frame means between said first and second operable positions, and actuating means for actuating said shutter means between said blocking and non-blocking positions.

2. An enclosed switchboard according to claim 1, wherein said panel frame means has a front opening, said panel frame means comprising a door for closing off and for opening up said front opening.

3. An enclosed switchboard according to claim 2, wherein said handle access opening is disposed in said door such that said moveable contact frame means is moveable between said first and second operable positions by said handle while said door is in said closed position.

4. An enclosed switchboard according to claim 1, wherein said actuating means comprises a circuit breaker mounted on said panel frame means and an interlock means between said circuit breaker and said shutter means, said circuit breaker having a connect mode and a disconnect mode, said interlock means being operable to disposed said shutter means in said blocking position when said circuit breaker is in said connect mode, said interlock means being operable to dispose said shutter means in said non-blocking position when said circuit breaker is in said disconnect mode.

5. An enclosed switchboard according to claim 4, wherein said circuit breaker has an OFF position, a TRIP position and an ON position, said circuit breaker being in said disconnect mode when said circuit breaker is in said OFF position and in said TRIP position, said circuit breaker being in said connect mode when said circuit breaker is in said ON position.

6. An enclosed switchboard according to claim 4, wherein said shutter means comprises a shutter support and a slidable blocking element slidably mounted on said shutter support, said interlock means comprising mechanical linkage means between said slidable blocking element and said circuit breaker.

7. An enclosed switchboard according to claim 6, wherein said linkage means comprises a pivotal lever.

8. An enclosed switchboard according to claim 6, wherein said linkage means comprises a cable.

9. An enclosed switchboard according to claim 6, wherein said shutter means comprises biasing means biasing said slidable blocking element in said non-blocking position.

10. An enclosed switchboard according to claim 5, wherein said circuit breaker comprises a rotary member which rotates when said circuit breaker rotates between said OFF, said TRIP and said ON positions, said interlock means being operably connected to said rotary member to maintain said shutter means in said non-blocking position when said circuit breaker is in said OFF and said TRIP positions and to move said shutter means to said blocking position when said circuit breaker is rotated to said ON position.

11. An enclosed switchboard according to claim 10, wherein said rotary member mounts a pin, said interlock means comprising a slidable member having an elongated slot, said pin being slidable in said slot without sliding said sliding member when said circuit breaker is rotated between said OFF and said TRIP positions.

12. An enclosed switchboard according to claim 11, wherein said elongated slot has a terminating end, said pin engaging said terminating end to slide said slidable member where said circuit breaker is rotated to said ON position.

13. An enclosed switchboard according to claim 1, wherein said handle access opening is an elongated slot elongated in a generally horizontal direction, said shutter means comprising a shutter blockable element which is generally vertically moveable to a position to block off at least a part of said slot.

14. An enclosed switchboard according to claim 1, wherein said handle access opening is an elongated slot elongated in a generally horizontal direction, said shutter means comprising a blockable element which is generally horizontally moveable to a position to block off at least a part of said slot.

15. An enclosed switchboard according to claim 1, further comprising a cover means pivotably mounted on said panel frame means between a closed and an open position, said cover means covering said handle access opening when in said closed position, said cover means exposing said handle access opening when in said open position so that said handle can be inserted into said handle-receiving means.

* * * * *